United States Patent [19]
Burke, Jr.

[11] 3,923,520
[45] Dec. 2, 1975

[54] FILM STRIP CASSETTE WITH MOVING PROCESSING FLUID DOCTORING SURFACE

[75] Inventor: Edward F. Burke, Jr., Reading, Mass.

[73] Assignee: Polaroid Corporation, Cambridge, Mass.

[22] Filed: July 26, 1974

[21] Appl. No.: 492,054

[52] U.S. Cl. ............... 96/78; 96/201; 352/78 R; 352/130; 354/317; 354/318
[51] Int. Cl.² ............... G03C 3/02; G03C 11/00; G03B 23/02; G03D 5/00
[58] Field of Search ........ 96/78, 201; 354/317, 318; 352/130, 78 R

[56] References Cited
UNITED STATES PATENTS

| | | | |
|---|---|---|---|
| 3,742,836 | 7/1973 | Cook et al. | 354/317 |
| 3,800,306 | 3/1974 | Land | 352/130 |
| 3,806,245 | 4/1974 | Land et al. | 352/130 |
| 3,809,465 | 5/1974 | Mason | 352/130 |

*Primary Examiner*—Charles L. Bowers, Jr.
*Assistant Examiner*—Richard L. Schilling
*Attorney, Agent, or Firm*—David R. Thornton

[57] ABSTRACT

A method and apparatus for applying processing fluid to the light sensitive emulsion surface of a photographic film strip contained in a multi-purpose cassette and in which a coating of processing fluid deposited directly onto the film strip is delimited by a doctoring surface moved in a direction opposite to the direction of film strip travel during passage thereof at the doctoring surface. The doctoring surface may be the cylindrical surface of a roller or it may be effected by a portion of the film strip itself. In the latter instance, the film strip is constrained to a loop-like path during processing by appropriate guide means so that one of the oppositely facing surfaces in the neck of the loop provides the doctoring surface for the coating on the other of such surfaces.

10 Claims, 11 Drawing Figures

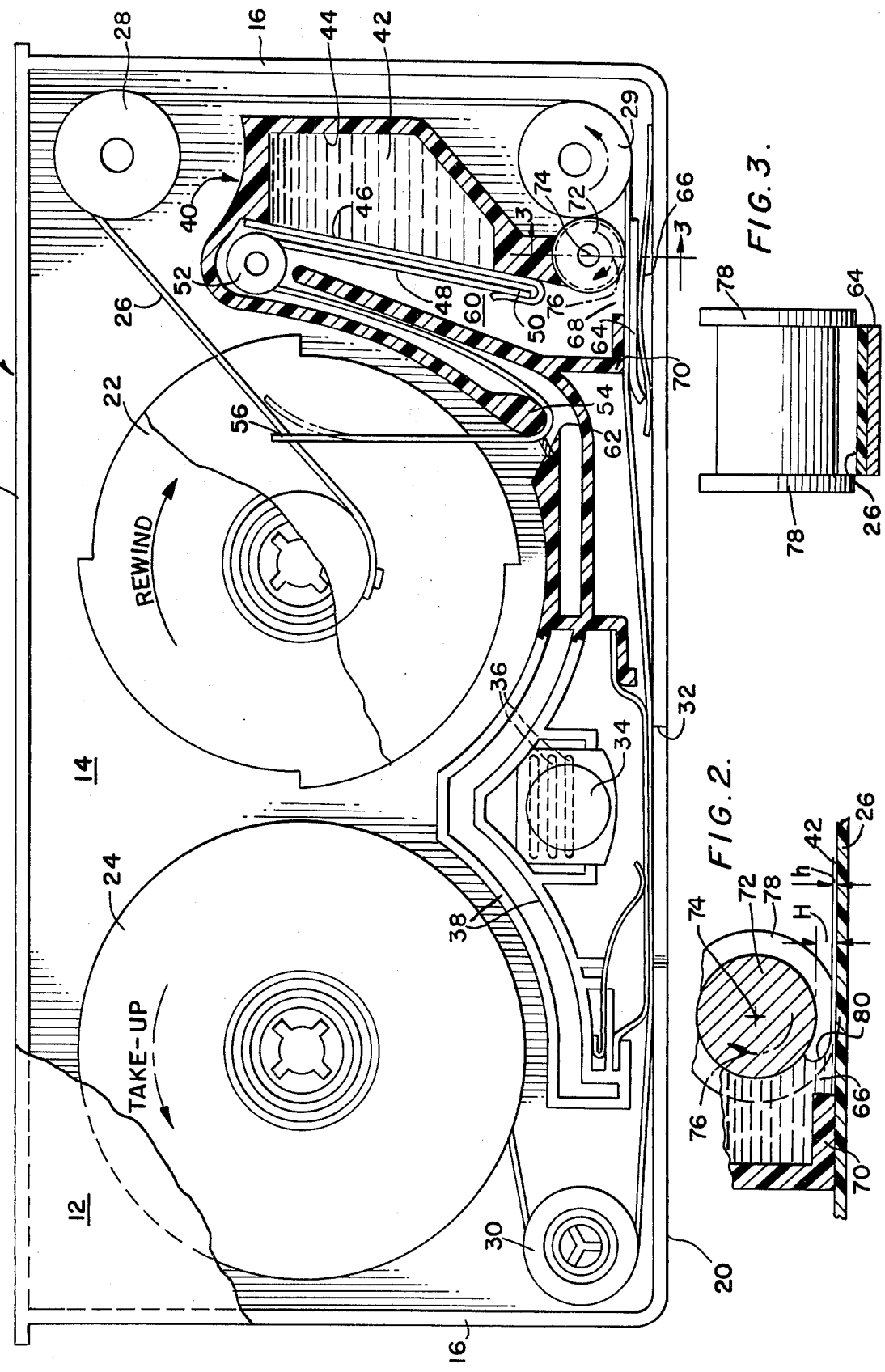

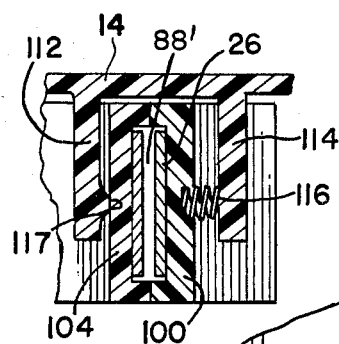
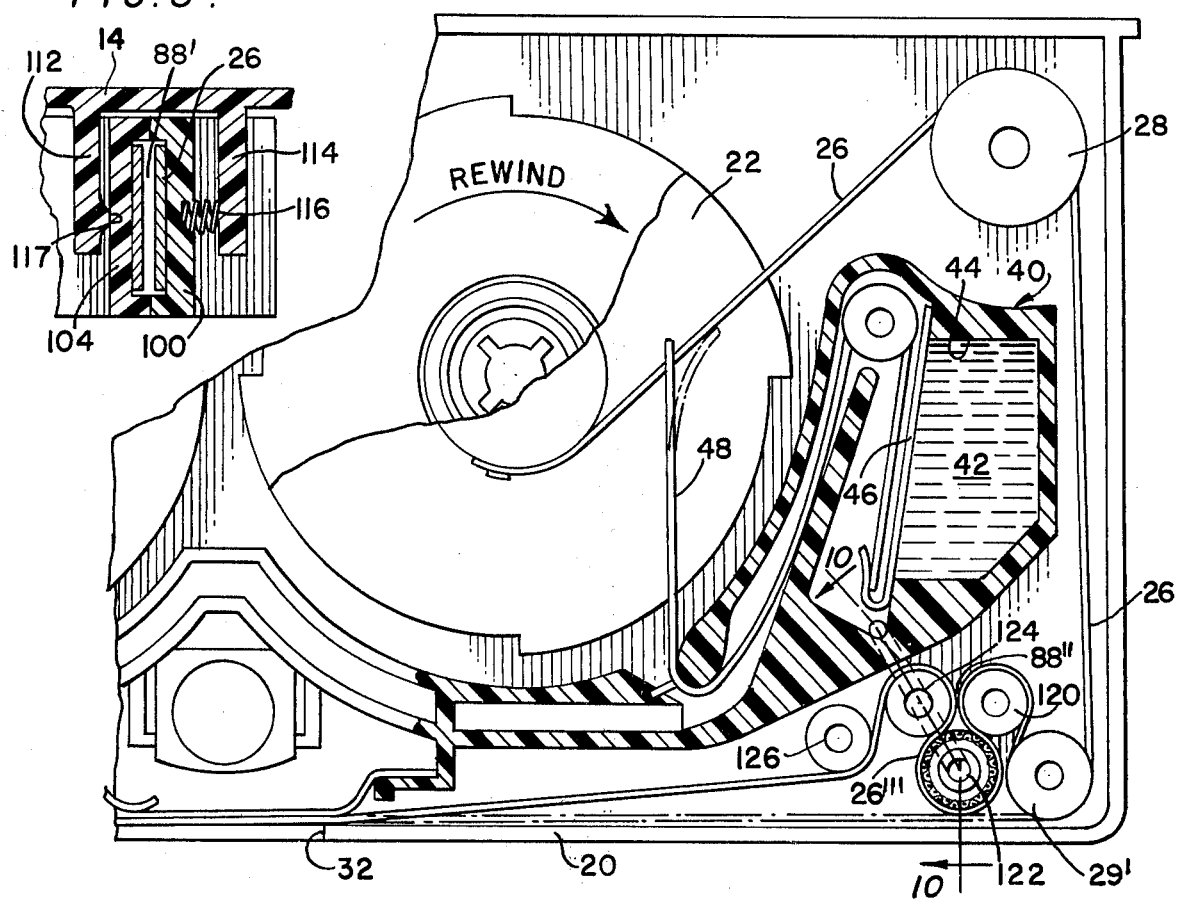
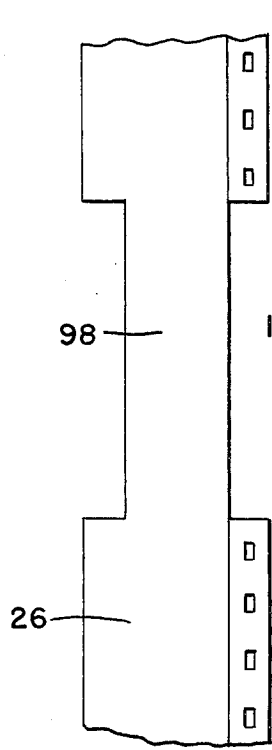
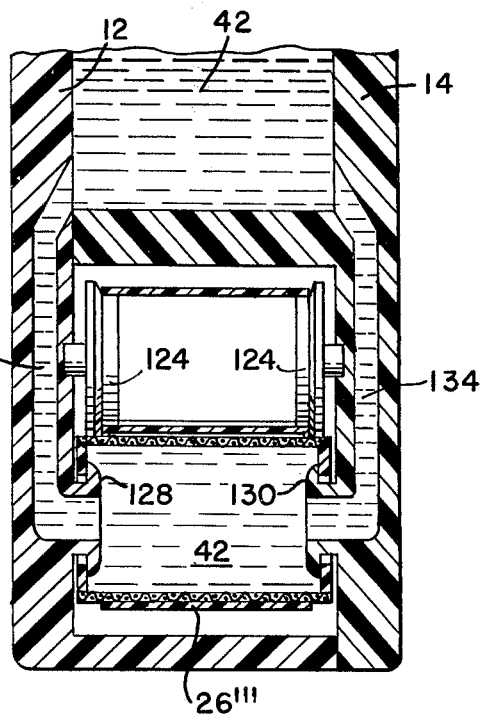

3,923,520

FILM STRIP CASSETTE WITH MOVING PROCESSING FLUID DOCTORING SURFACE

BACKGROUND OF THE INVENTION

This invention relates to methods and apparatus for processing photographic film strips and more particularly, it concerns an improved method and apparatus for distributing processing fluid supplied in the processor of a multi-purpose film cassette uniformly over the surface of a strip of exposed film in such a manner that deleterious effects of foreign particles such as dust carried by the film strip are avoided.

Recent developments in the motion picture art include systems by which a supply of light sensitive film contained in a multi-purpose cassette can be exposed in a camera adapted to receive the cassette and then processed or developed to provide the conventional series of positive transparent image frames during rewind movement of the film strip by a viewing apparatus into which the cassette is placed after exposure in the camera. At the initiation of the processing cycle in the viewing apparatus, an initially sealed supply of processing fluid contained in the cassette is opened to release the processing fluid for deposition along the length of the film. After processing in this manner, the viewing device is operated as a projector to advance the film incrementally, frame by frame past the light source so that the scene to which the film was exposed is reproduced on a screen. The coating of the processing fluid on the exposed light sensitive emulsion surface of the film strip preferably effects a diffusion transfer of a negative image within the emulsion layer to a positive image receiving layer or interface. U.S. Pat. Nos. 3,788,140 and 3,800,306 issued respectively on Dec. 11, 1973 and Mar. 26, 1974 to Edwin H. Land as well as U.S. Pat. No. 3,806,245 issued on Apr. 23, 1974 to Edwin H. Land et al. and U.S. Pat. No. 3,809,465 issued on May 7, 1974 to Paul B. Mason contain exemplary disclosures of such systems.

The achievement of a uniform layer of processing fluid on the emulsion side of the film strip is essential to satisfactory operation of the overall motion picture system aforementioned. Deviation from a uniform coating of processing fluid within extremely small tolerances will result in undesirable blemishes in the image viewed during projection of the processed film. Moreover, the fact that the cassette with all of its operating components including the processor serves as a permanent storage receptacle for the film strip both before and after the exposure processing requires that the components employed for the deposition of processing fluid be capable of mass production manufacturing techniques and the tolerance levels incident to such techniques for the system as a whole to be acceptable in a competitive commercial market.

Consequently, in one type of coating applicator as described in the aforementioned U.S. Pat. No. 3,809,465 a roller member which is coated with fluid is brought into contact with the emulsion layer of the film strip during rewind movement of the latter. The uniform layer of processing fluid is achieved with rotation of the coating roller in a direction opposite to that of the film strip. Although this arrangement will generally produce satisfactory results, the contact between the fluid coated roller and the film emulsion can in some instances have objectionable effects on the emulsion. Experience with many diverse forms of coating appliances capable of use within the multi-purpose cassette of such systems has demonstrated that most promising results are achieved by feeding the processing fluid through a nozzle opening onto the emulsion surface of the film strip during rewind movement thereof allowed by a doctoring surface which is spaced from the film strip and which squeezes or butters the fluid across the width of the film strip emulsion without direct contact thereto. A multi-purpose film cassette processor of this type is disclosed in a copending application Ser. No. 360,678 filed May 16, 1973 by Edward F. Burke, Jr. et al. and assigned to the assignee of the present invention. In that processor, an inclined doctoring surface is provided in a molded nozzle structure downstream from the opening through which the processing fluid passes into contact with a moving run of the film strip during rewinding travel after exposure. The inclined doctoring surface develops a positive pressure gradient to insure uniform distribution of the positive processing fluid over the emulsion side of the film strip.

As pointed out in the aforesaid copending application Ser. No. 360,678, a processing fluid coating of approximately 0.0005 inches in depth or thickness is provided by a doctoring surface inclined so that its trailing edge is approximately 0.007 inches above the surface of the emulsion on which the processing fluid is deposited. In light of the narrow gap thus defined between the trailing edge of the doctoring surface and the film strip, which gap is generally in the order of one and one half to twice the fluid layer thickness, there is an apparent tendency for minute particles such as particles of dust or the like which may be on the emulsion surface to accumulate at the trailing edge of the doctoring surface. The accumulation of such particles, in turn, results in an irregular doctoring surface transversely of the film strip. Moreover, the accumulation is compounded as the processing operation progresses such that an undesirable streaking occurs in the layer of processing fluid deposited on the emulsion side of the film strip, which streaking is visible as a blemish in the processed film strip during projection.

SUMMARY OF THE PRESENT INVENTION

In accordance with the present invention, the advantages of a doctoring surface for forming a fluid layer in film cassettes of the type used in the aforementioned systems are retained while interference from particles is reduced. In the novel arrangement, the minimal gap between the doctoring surface and the emulsion side of the film strip is increased, to allow particles to pass without adverse effects, by means of a movable doctoring surface formed by the cylindrical surface of a roller or by a portion of the film itself, which is adapted to travel in a direction opposite to the direction of travel of the layer receiving portion of the film strip during processing. By virtue of the doctoring surface moving in a direction opposite to that of the film, particles are continually removed from the spacing between the doctoring surface and the film, and the latter spacing is also increased to approximately four times the thickness of the processing fluid to be deposited on the film.

Several specific forms or embodiments of the apparatus are contemplated in accordance with the invention, such as the use of a rotatable doctoring roller arranged within the cassette for reverse rotation relative to the film strip or the use of guide rollers which establish a loop in the film strip, the formation of the loop defining a necked portion in which mutually facing emulsion sides of the film strip are traveling in opposite directions. In the latter form, the processing fluid is deposited on the inside of the looped film strip portion either directly or by appropriate means such as a rotating perforate or foraminous drum. Also the rollers defining the loop may be formed as opposed stub rollers engaging only a portion of the film width so that by providing a necked down portion of the film strip at the end thereof last to be processed, the loop will be dropped after deposition of processing fluid and thus present no obstacle to subsequent projection cycles.

Among the objects of the present invention are therefore: the provision of an unique method and apparatus for depositing processing fluid uniformly across the emulsion surface and along the length of a photographic film strip; the provision of such a method and apparatus by which the processing fluid is doctored onto the emulsion side of the film strip without adverse effects caused as a result of dust particles positioned on the emulsion surface of the film strip; the provision of a processing apparatus for multi-purpose photographic film cassettes of the type referred to incorporating a doctoring surface for application of processing fluid to the emulsion side of the film strip and which moves in a direction opposite to the film strip thereby to enable increased spacing between the doctoring surface and the film strip; the provision of a processing apparatus incorporating a doctoring surface formed by a moving portion of the film strip itself, thereby to effect a continuously changing doctoring surface during the application of processing fluid to the film strip; and the provision of a processor apparatus for multi-purpose film cassettes of the type referred to which facilitates an accommodation of a film strip path most desirable for projection after processing of the film strip.

Other objects and further scope of applicability of the present invention will become apparent from the detailed description to follow taken in conjunction with the accompanying drawings in which like reference numerals designate like parts.

BRIEF DESCRIPTION OF THE DRAWINGS

FIG. 1 is a diagrammatic front elevational view partially in section of a multi-purpose photographic film cassette illustrating one form of the present invention;

FIG. 2 is an enlarged fragmentary cross-section in essentially the same plane as FIG. 1 but illustrating the coating operation of the apparatus shown in FIG. 1;

FIG. 3 is an enlarged fragmentary cross-section taken on line 3—3 of FIG. 1;

FIG. 8 is an enlarged fragmentary cross-section taken on line 8—8 of FIG. 6;

FIG. 9 is a view similar to FIGS. 1, 4 and 6 but illustrating a further alternative embodiment of the apparatus of the invention;

FIG. 10 is an enlarged fragmentary cross-section taken on line 10—10 of FIG. 9; and FIG. 11 is an enlarged plan view illustrating an end portion of the film strip to be used with the embodiments of FIGS. 4, 6 and 9.

DESCRIPTION OF THE PREFERRED EMBODIMENTS

Figure 4:
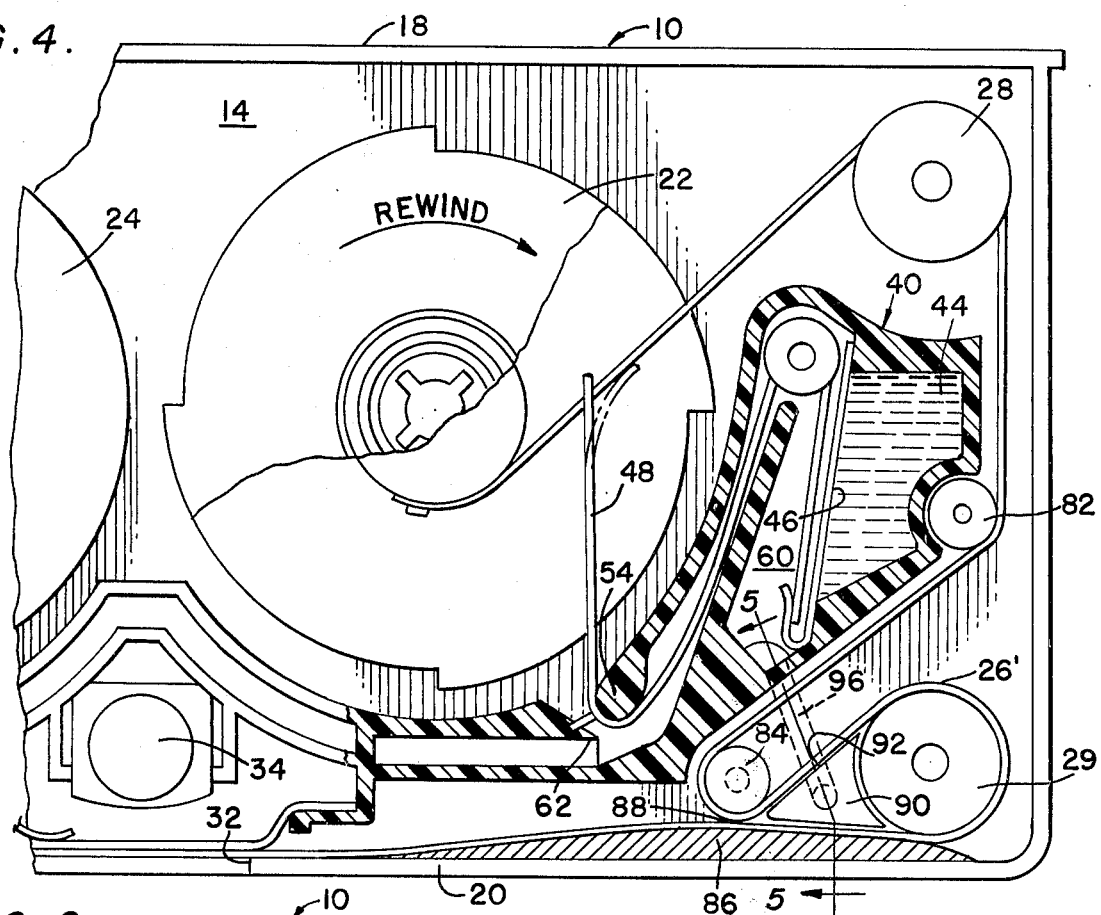
FIG. 4 is a fragmentary cross-section through a multi-purpose film cassette incorporating an alternative form of the apparatus of this invention.

The multi-purpose film cassette with which the method and apparatus of the present invention is particularly adapted for use is illustrated in FIG. 1 to include an outer housing 10 in the shape of a rectangular parallelepiped having front and back walls 12 and 14 respectively, end walls 16, a top wall 18 and a bottom wall 20. Mounted for rotation between the front and back walls are supply and take-up spools 22 and 24 to which supply and take-up leader ends of a film strip 26 are affixed by appropriate means. In passing from the supply spool 22 to the take-up spool 24, the film strip 26 is trained through a series of runs defined by idler rolls 28, 29 and 30. As shown, the film strip 26 is trained over an opening 32 in the bottom wall 20 both for exposure in an appropriate camera (not shown) and also for projection in a viewer or projector (also not shown) by illumination passed through a reflecting prism lens 34 mounted in the cassette behind the opening 32 and the film strip run passing thereover. Situated behind the prism 34 are air vent openings 36 in the rear wall 14 to enable the circulation of air over the prism 34 for cooling and also for drying after film strip processing in the manner to be described below. Both the air vents 36 and the prism 34 are isolated from the supply and take-up spool 22 and 24 by a labyrinth-type light seal formed in part by internal ribs 38.

Also contained in the cassette housing 10 is a processor generally designated by the reference numeral 40 and operative after exposure of the film strip 26 to deposit a layer of processing fluid 42 onto the emulsion side of the film strip and over the entire length thereof. The processor includes a reservoir 44 in which the processing fluid 42 is initially sealed by a tear tab closure 46 secured over a planar opening in the reservoir. Although the fluid chamber 44 is shown in FIG. 1 to be established by an integral processor construction, cassette manufacture in practice is facilitated by the use of a separate pod adapted to be received in the processor, the pod being loaded with the processing fluid 42 and having affixed thereto the tear tab closure 46.

To enable release of the initially sealed processing fluid 42 from the chamber 44 after exposure of the film strip 26, a pull strip 48 having one end 50 releasably secured to the tear tab closure 46 is trained about a guide roller 52 and a radius wall portion 54 so that a free end 56 of the pull strip may be engaged by an aperture (not shown) in the supply spool end of the film strip 26 upon initial rewind movement thereof. The operation of the pull strip 48 is described fully in a copending application Ser. No. 428,377, filed Dec. 26, 1973, by Joseph A. Stella et al and assigned to the assignee of the present invention. In essence, the free end portion 56 of the pull strip 48 will ride against the film strip 26 in the position illustrated in phantom lines in FIG. 1 as the film strip is payed from the supply spool 22 to the take-up spool 24 during exposure of the film strip. Reversal of the film strip during rewind, however, will effect an attachment of the pull strip to the supply end leader of the film strip so that the pull strip will be wound with the film on the supply spool. As a consequence, the tear tab closure 46 will be drawn away from the reservoir opening to release the processing fluid 42 to a second chamber 60 in the processor. A knife-like edge 62 opposite to the radius portion 54 will cause the tear tab 46 to release from the pull strip 48 so that the tear tab 46 will not be carried with the pull strip 48 within the convolutions of film wound on the supply spool 22.

The bottom of the chamber 60 opens to the upwardly facing emulsion side of the film strip 26 in a manner to be described in more detail below. Also, a pressure pad 64 supported by a leaf spring 66 retains the film strip in operative relation to the bottom of the chamber 60 during processing.

It is to be noted that the multi-purpose cassette and components described in the preceding paragraphs represent a cassette structure which, in itself, is not novel with the present invention. It is important to a full understanding of the method and apparatus of the present invention, however, that the characteristics and operation of the cassette illustrated in FIG. 1 be understood. Specifically, after exposure of the film strip by incremental advance thereof past the opening 32 in a direction proceeding from the supply spool 22 to the take-up spool 24, a processing operation is initiated by driving the supply spool at constant angular velocity to rewind the film strip from the take-up spool 24 back onto the supply spool 22. This procedure is effected by removing the cassette from the camera in which it is exposed and placing it in a viewer device (not shown) equipped with appropriate means for driving the supply spool 22 to rewind the film strip 26 in the manner described. During such rewinding movement, the emulsion side of the film strip will be drawn past the processor 40 to receive a layer of processing fluid now released from the chamber 44 as a result of the closure 46 having been removed in the manner described above. Subsequent to processing in this manner, the film strip is advanced incrementally, frame by frame, past the opening 32 and the prism lens 34 for projecting of successive image frames in a manner well known in the motion picture art.

In one form of the invention as shown in FIGS. 1–3 of the drawings, gravity deposition of the procesing fluid 42 from the chamber 60 as a coating onto the emulsion side of the film strip 26 is effected by an opening 68 defined at its leading edge by the trailing end of a guide shoe 70 at the bottom of the chamber 60. The bottom of the guide shoe 70 bears against the film strip 26 as it passes the processing 40 as a result of the pressure pad 64 and spring 66 engaging the opposite side of the film strip at this time. The rear or trailing edge of the opening 68 in this embodiment is established by the cylindrical surface of a roller 72 journalled for rotation about an axis 74 extending transversely of film strip travel. Means are provided for driving the roller 72 rotatably in a direction designated by the arrow 76 in FIGS. 1 and 2 and opposite to the linear direction of film strip travel during processing. Although the means by which such rotation of the roller 72 is carried out in practice may vary, one acceptable means for driving the roller is shown in FIGS. 1–3 to include a pair of flanges 78 at the ends of the roller overhanging the film strip 26, the flanges being of sufficient diameter to engage frictionally the periphery of the guide roller 29 being rotated by the film strip during rewind processing thereof. It is contemplated that the frictional engagement of the flanges 78 with the guide roller 29 may be augmented by such means as knurling, gear teeth or the like.

As shown most clearly in FIGS. 2 and 3 of the drawings, the radius of the roller 72 and position of its rotational axis 74 relative to the bottom of the guide shoe 70 is selected so that the cylindrical surface of the roller is elevated by a distance H above the emulsion surface of the film strip 26 and further that the height $h$, representing the thickness of a layer or coating of the processing fluid 42 deposited onto the film strip, is substantially less than the height H of the roller surface above the film strip. In practice, the thickness of the processing fluid layer required for satisfactory processing of the emulsion layer on the film strip is approximately 0.0005 inches. To delimit the thickness of the coating of processing fluid 42 deposited on the emulsion side of the film strip uniformly across its width, it is contemplated that the height H of the moving cylindrical surface on the roller 72 may range from between $2h$ to slightly greater than $4h$ and preferably be in the order of $4h$ which would provide a gap of approximately 0.002 inches.

Advantageously, this provides a two-fold increase of the coating gap as compared to the prior devices. The significance of the increase in this dimension H is that small particles in the processing fluid 42 or on the film strip 26, for example dust particles carried by the film strip, will freely pass the roller 72 without accumulating on the surface thereof or without possibly providing deleterious irregularities in the surface of the roller which may result in unevenness of the processing fluid coating across the width of the film strip. The relatively wide spacing of the roller periphery from the film strip is possible due to the reverse rotation of the roller and surface adherence of the processing fluid to the roller. In particular, this combination of factors results in the formation of a relatively large meniscus 80 in the processing fluid as shown in FIG. 2, for example.

As noted above, the increased gap between the doctoring surface (the periphery of roller 72) and the film permits particles to move easily past the doctoring surface. Further, however, since the roller 72 is run in reverse direction to the film, particles are continually driven back away from the gap. Moreover, to keep the roller itself free from particles, the processor housing 44 includes a wiper forming wall portion designated at 45 which extends into close proximity preferably light frictional contact with the roller periphery, so as to continually wipe the roller.

Additional understanding of the present invention may be had by a comparison thereof with the processor disclosed in the above-cited U.S. Pat. No. 3,809,465. In that patent, a processing fluid applicator is shown to include a wick-fed roller rotated in a tangential direction opposite to direction of film strip travel but biased into surface contact with the film strip in contra-distinction to the novel flow of processing fluid first directly onto the film strip followed by a reversely rotating doctoring surface spaced from the film strip.

The complete operation of the cassette 10 will now be briefly described. The film strip 26, initially wound about the supply spool 22 and provided with a take-up leader extending about the guide rollers 28, 29 and 30 to a connection to the take-up spool 24, is exposed in the manner described above by incremental passage of the film strip in the camera past the opening 32. After exposure, the film strip will be wound about the take-up spool with a supply leader extending in the reverse direction back to the supply spool 22. Upon placement of the cassette into a viewing apparatus of the type disclosed in the above-mentioned U.S. patents, a processing cycle will be initiated by driving the supply spool 22 in a rewind direction. Rewind movement of the film strip 26 in this manner will initiate rotation of the guide roller 29 as well as rotation of the roller 76 in an opposite direction or in the direction of the arrow 76 in FIGS. 1 and 2. Also with initial rewind movement of the film strip, the tear tab 46 will be removed from the reservoir 44 allowing the processing fluid 42 to flow into the chamber 60 and through the opening 68 onto the exposed emulsion surface of the moving film strip. As a result of the reversely rotating action of the roller 72, the processing fluid will continue to flow through the opening onto a uniform layer over the emulsion surface of the film strip until processing is completed. Thereafter, the developed film strip may be exposed by incremental advance past the prism-lens 34 and rewound for subsequent projection cycles in a conventional manner.

Figure 5:
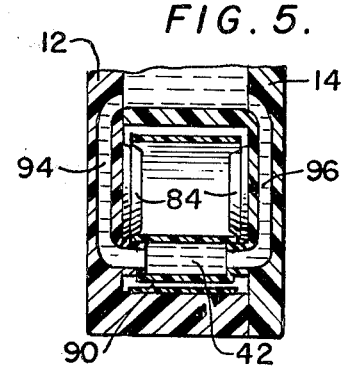
FIG. 5 is an enlarged fragmentary cross-section taken on line 5—5 of FIG. 4.

An alternative embodiment of the processing method and apparatus of the present invention is shown in FIGS. 4 and 5 of the drawings. The film strip 26 is initially trained from the supply spool 22 about the guide rollers 28 and 29 to the take-up spool 24 in the manner described above with respect to the embodiment of FIG. 1. In this embodiment, however, the run of the film strip 26 between the guide rollers 28 and 29 is initially trained about an additional guide roller 82 and about a pair of coaxial stub rollers 84 in a path to establish a loop 26' in the film strip 26 about the roller 29. As shown in FIG. 4, the loop 26' extends around the guide roller 29 and back over a contoured track 86 formed inside the bottom wall 20 of the cassette housing 10. The contoured track 86 guides the film strip in a path to establish in the loop 26' a neck or gap 88 with the film strip portion trained about the stub roller pair 84. Disposed within the loop 26' between the guide roller 29 and the neck 88 of the film strip loop is a triangularly shaped trough 90 opened at its top 92 and in communication with the fluid chamber 60 by way of fluid passageways 94 and 96 (see also FIG. 5) formed respectively in the front and rear walls 12 and 14 of the cassette housing 10.

The spacing between the mutually facing emulsion surfaces of the film strip in the neck of the loop or gap 88 is selected to be the same as the spacing of the cylindrical surface of the roller 72 in the embodiment of FIG. 1 or the dimension H. Thus, in the operation of the embodiment illustrated in FIGS. 4 and 5, after the tear tab 46 has been removed to pass the processing fluid 42 into the chamber 60 and through the passageways 94 and 96 into the trough 90, rewinding of the film (towards the supply spool 22) during processing will effect a deposition of the processing fluid on the emulsion layer at the underside of the film run passing between the guide roller 29 and the stub roller pair 84. Immediately thereafter, the deposited processing fluid will be doctored by the emulsion side of the film strip in the run passing over the track 86 to the guide roller 29. Because the film strip itself serves as a doctoring surface in this embodiment, and also because of the spacing of the doctoring surface with respect to the coated film strip surface as explained above with respect to FIGS. 1–3, not only will particles on the film strip be allowed to pass but also a clean, fresh doctoring surface is continually presented over the length of the film strip.

Since the path taken by the film strip about the rollers 84 and 29 through the loop 26' represents an unnecessarily complex path for the film during repeated projection cycles once the processing cycle has been completed, provision is made for disengaging the film strip from the stub roller pair 84 at the end of the processing cycle. As shown in FIG. 11 of the drawings, the film strip 26 or preferably an end leader attached to the take-up spool 24 is provided with a necked-down portion 98. Initially, the cassette is loaded with film with the necked-down portion advanced forward of the stub roller pair 84 so that the film strip 26 is retained about the roller pair 84 during both exposure and the first rewind. At the end of rewind, however, when the fluid deposition portion of the processing cycle is completed, continued rewind movement of the film strip will bring the necked-down portion 98 to the stub roller pair 84. As a result of the relatively narrow width of the necked-down portion, the film strip or take-up leader thereof will pass between the respective rollers of the pair 84 so that the film strip will thereafter lie in a straight line path between the guide rollers 29 and 28.

Figure 6:
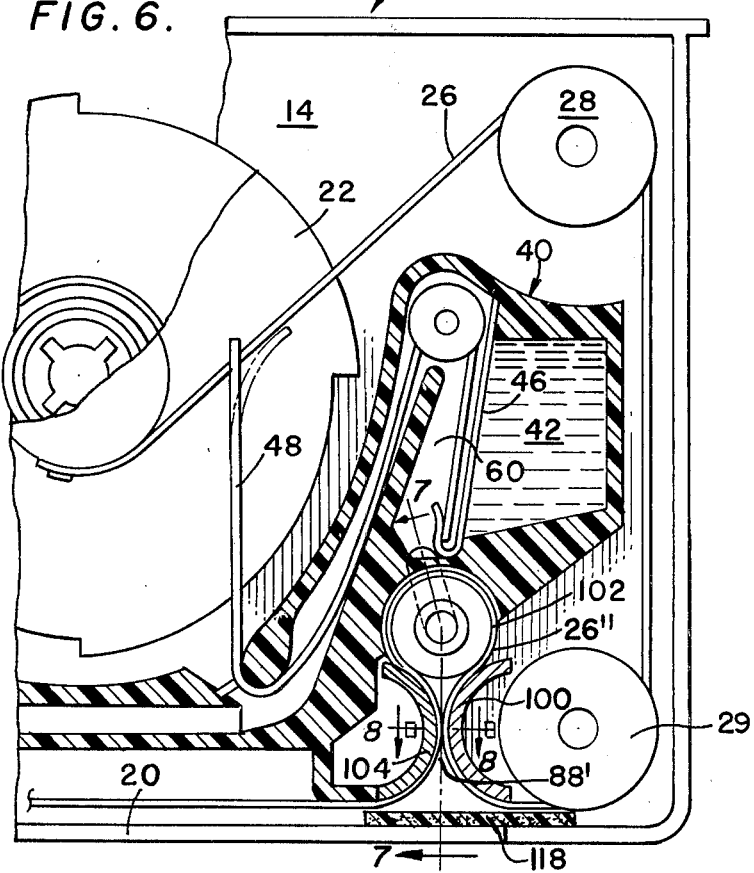
FIG. 6 is an enlarged cross-section similar to FIG. 4 but illustrating still another form or embodiment of the present invention.
Figure 7:
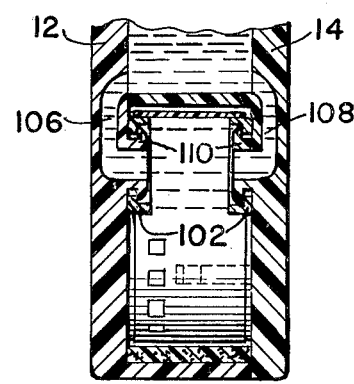
FIG. 7 is an enlarged fragmentary cross-section taken on line 7—7 of FIG. 6.

Another alternative embodiment of the invention is illustrated in FIGS. 6–8 of the drawings. As in the embodiment of FIGS. 4 and 5, the doctoring surface for delimiting the thickness of the processing fluid layer coated onto the emulsion side of the film strip 26 after exposure is again provided by the film strip itself in a gap 88' formed in the neck of a loop 26''. In contrast to the previously described embodiments, portions of the outwardly facing surface of the film strip are brought into facing relation at the neck 88'. Hence, this outwardly facing surface of the film strip 26 must be the emulsion surface for proper processing operations.

In this arrangement, as shown most clearly in FIG. 6, the film strip 26 extends again from the supply spool 22 about the guide rollers 28 and 29 and then upwardly about a semicylindrical guide shoe 100 to form a loop 26'' about a stub roller pair 102 and then downwardly about a second semi-cylindrical guide shoe 104. A pair of fluid passageways 106 and 108 extend downwardly from the fluid chamber 60 in the front rear walls 12 and 14 respectively of the cassette 10 as shown more clearly in FIG. 7 and open through journals 110 rotatably supporting each of the rollers in the stub roller pair 102.

As shown in FIGS. 6 and 8, the arcuate or semicylindrical guide shoes 100 and 104 are supported at their lateral ends between two projections 112 and 114 extending from the rear walls 14 of the cassette housing 10. A helical compression spring 116 biases the guide shoe 100 against the guide shoe 104 in turn supported by a bearing point 117 formed on the projection 112. Also as shown in FIG. 8, the guide shoes are formed with mutually facing film tracks recessed therein so that abutment of the shoe edges overhanging opposite edges of the film strip will effect a predetermined spacing of the opposed film strip portions in the gap 88'. As in the previous embodiments, the amount by which the opposed film strip portions are spaced in the gap is preferably in the order of four times the thickness of the processing fluid layer to be deposited on the film strip.

In the operation of the embodiment of FIGS. 6–8, rewind movement of the film strip onto the supply spool 22 will operate to remove the tear tab 46 in the same manner as in the previous embodiments, allowing the processing fluid 42 to flow into the chamber 60 and then down through the passageways 106 and 108 to fall directly on the film strip in the loop 26''. The processing fluid deposited on the run of film strip on the guide shoe 100 will be doctored by the film strip moving in the opposite direction along the guide shoe 104. A sponge 118 or other suitable absorbent material is secured on the bottom wall 20 of the cassette housing to absorb any processing fluid which may fall through the gap 88'. Also as in the embodiment of FIG. 4, the take-up leader end of the film strip is provided with the necked-down portion 98 as explained above with respect to FIG. 11 so that at the end of the processing cycle, the loop 26'' will fall from the stub roller pair 102 and be pulled through the guide shoes 100 and 104. The spring 116 will allow the guide shoe 100 to retract at this time so that the loop may be pulled through the guide shoes.

A still further embodiment of the invention is illustrated in FIGS. 9 and 10 of the drawings. In this embodiment, the film strip 26, after passing the guide roller 28, is trained about a guide roller 29' upwardly about a first stub roller pair 120 downwardly in a loop 26''' about a perforated or foraminous rotatable drum 122, upwardly about a second stub roller pair 124 and then downwardly about a guide roller 126 to the exposure-projection opening 32 in the bottom wall 20 all as shown in solid lines in FIG. 9. The drum 122 is supported on opposite sides by journals 128 and 130 formed in the front and rear walls 12 and 14 of the cassette and through which fluid carrying passageways 132 and 134 pass in communication from the chamber 60. Also it will be noted as shown in FIG. 10 that the outside diameter of the journals 128 and 130 are smaller than the internal diameters of the circular apertures in the ends of the drum 122 so as to allow the drum to float or be radially displaced in some measure during rotation on the journals 128 and 130. This arrangement permits the drum 122 to be drawn into secure frictional engagement with the film which ensures rotation of the drum and hence a free flow of the fluid 42 to the film. Further, since the drum, under these conditions, sandwiches the film or at least the margins thereof between itself and the roller pairs 120 and 124, the film is also bent or drawn tightly against the roller pair thereby ensuring precise definition of a gap 88'' which, as in the embodiments of FIGS. 4, 5 and 6–8, is established in the neck of the loop 26''' as a result of the film wraps about the stub roller pairs 120 and 124.

In the operation of the embodiment shown in FIGS. 9 and 10, after exposure the film strip 26 will be drawn back to the supply spool 22 through the path illustrated in solid lines in FIG. 9 during which time the processing fluid 42 in the perforate drum 122 will be deposited on the emulsion side of the film strip in the loop 26'''. As the film passes upwardly about the stub roller pair 120, the processing fluid coated thereon will be doctored by the film strip wrap about the stub roller pair 124 moving in the opposite direction. By providing the take-up leader end of the film strip 26 with the necked-down portion 98 described above with respect to FIG. 11, on completion of the processing cycle the film strip will drop from the stub roller pairs 120 and 124 to assume the path illustrated in phantom lines in FIG. 9. Also in this connection, it is to be noted that the lower surface of the drum 122 is elevated sufficiently above the lower surface of the guide roller 29' that the film strip will not be contacted by the drum after its processing function has been served.

Thus it will be seen that by this invention there is provided an unique method and apparatus for processing photographic film strips permanently contained in a multi-purpose film cassette and by which the above-mentioned objectives are completely fulfilled. Also, various modifications and changes in the disclosed embodiments are contemplated and will be apparent to those skilled in the art from the preceding description. It is expressly intended therefore that the foregoing description is illustrative of preferred embodiments only, not limiting, and that the true spirit and scope of the present invention will be determined by reference to the appended claims.

What is claimed is:

1. In a cassette containing an elongated photographic film strip having a light sensitive emulsion on one surface thereof and also containing a processor operative to apply a processing fluid coating of predetermined thickness to substantially the entire length of said film emulsion after exposure thereof, the improvement comprising:

means responsive to an external actuator for progressively advancing said film strip within said cassette;

means for treating progressive incremental sections of said emulsion surface of said film strip with a quantity of said processing fluid having an initial thickness substantially greater than said predetermined thickness of said coating as said film strip is advanced therepast by said film strip advancing means; and means responsive to an external actuator for establishing a moving doctoring surface operative against said initial thickness of said processing fluid applied to said film strip by said fluid treating means to reduce said initial thickness of said processing fluid and spread said processing fluid uniformly across the width of said emulsion surface, said doctoring surface when operative moving in a direction opposite to the direction of advancement of said film strip past said fluid treating means and being spaced from said emulsion surface of portions of said film strip emerging from said fluid treating means a distance substantially less than said initial thickness of processing fluid and greater than said predetermined thickness of processing fluid coating.

2. The cassette recited in claim 1 wherein said doctoring surface is spaced from said emulsion surface of said film strip portions by a distance in the range of approximately 2 to 4 times said predetermined thickness of processing fluid coating.

3. The cassette recited in claim 1 wherein said means for establishing said moving doctoring surface comprises a roller rotatably mounted within said cassette, the cylindrical surface of said roller comprising said doctoring surface.

4. The cassette recited in claim 1 wherein said means for establishing said moving doctoring surface comprises means for guiding progressive portions of said film strip, prior to their being brought into operative relationship with said fluid treating means, into engagement with said fluid on progressive section of said film strip having been advanced past said fluid treating means.

5. The cassette of claim 3 additionally including means for cleaning said processing fluid from said cylindrical surface of said roller during the rotation thereof.

6. The cassette recited in claim 4 wherein said doctoring surface establishing means comprises means for guiding said film strip through a loop formation having a neck portion at which sections of said emulsion surface of said film strip are in mutually facing relation, and said fluid treating means comprises a trough located in said loop and having an opening along a portion of said film strip in said loop, and means for feeding said processing fluid to said trough and through said opening to said emulsion surface of said film strip during movements thereof through said loop in the operation of said processor.

7. The cassette recited in claim 4 wherein said doctoring surface establishing means comprises means for guiding said film strip through a loop formation having a neck portion at which sections of said emulsion surface of said film strip are in mutually facing relation.

8. The cassette recited in claim 7 wherein said loop is oriented above said neck portion when said cassette is oriented for operation of said processor and wherein said fluid treating means includes fluid passageways opening within said loop above said neck portion thereof.

9. The cassette recited in claim 7 wherein said fluid treating means comprises a rotatable drum having a pervious cylindrical surface about which said loop is formed and means to supply said processing fluid to said drum during operation of said processor for deposition of said fluid onto said emulsion side of said film strip through said pervious cylindrical surface.

10. The cassette recited in claim 7 wherein said means to guide said film strip through said loop comprises at least one pair of transversely spaced concentric stub rollers to engage the longitudinal margins of said film strip and wherein the end of said film strip last to be processed is formed with a length of reduced width to pass between said stub roller pair thereby to remove said loop from said film strip upon completion of processor operation.

* * * * *